United States Patent Office.

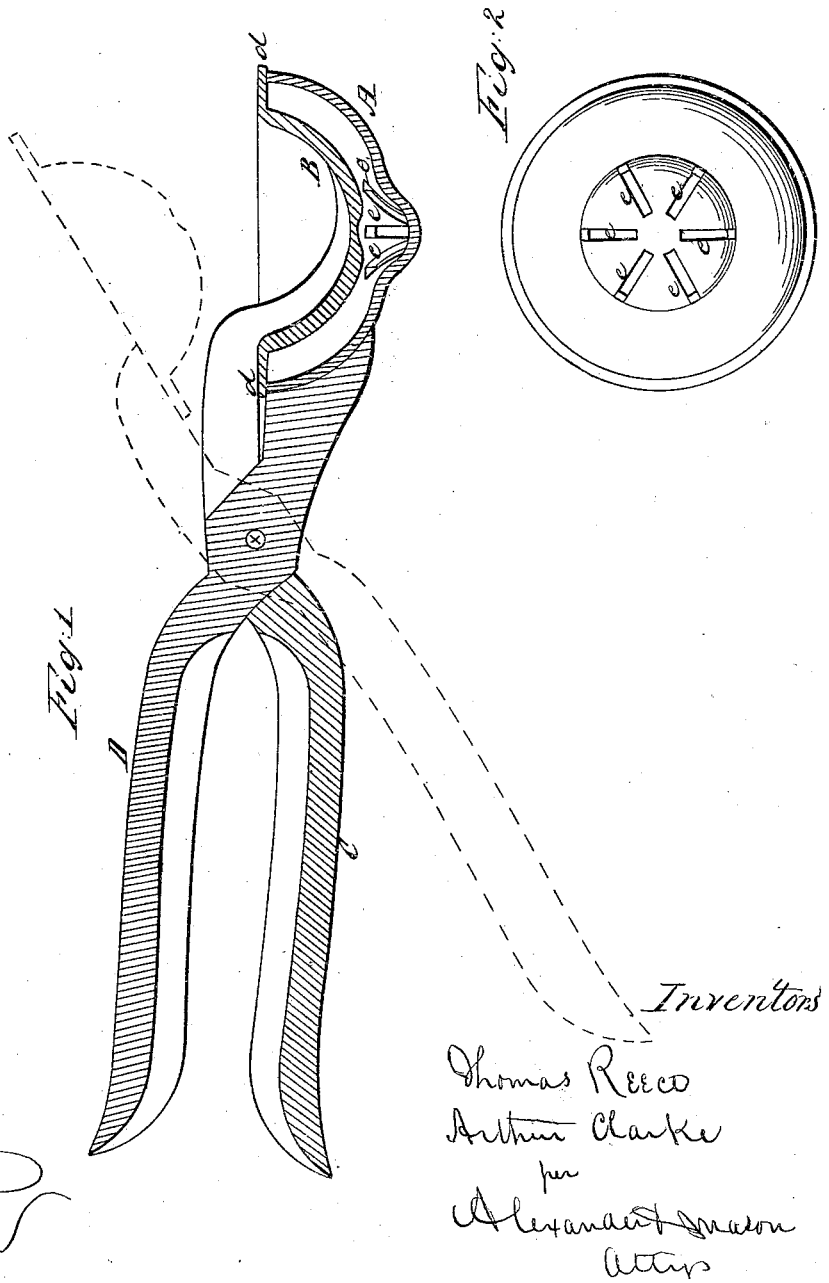

THOMAS REECE AND ARTHUR CLARKE, OF PHILADELPHIA, PENNSYLVANIA.

Letters Patent No. 61,251, dated January 15, 1867.

IMPROVED LEMON-SQUEEZER.

The Schedule referred to in these Letters Patent and making part of the same.

TO ALL WHOM IT MAY CONCERN:

Be it known that we, THOMAS REECE and ARTHUR CLARKE, of Philadelphia, in the county of Philadelphia, and in the State of Pennsylvania, have invented certain new and useful improvements in "Lemon-Squeezers;" and do hereby declare that the following is a full, clear, and exact description thereof, reference being had to the accompanying drawings, and to the letters of reference marked thereon.

In the annexed drawings, making part of this specification, A and B represent two cups made of metal or wood or of any other suitable materal. If made of metal they can be galvanized, or if made of wood they can be tinned so as to prevent corrosion from the action of the acid upon them. The cup B is made smaller than cup A, as represented, and works within it with its bottom down. This cup B is provided around its mouth with a flange, $d$, which catches upon the mouth of cup A when the two cups are brought together, as shown in Figure 1. These cups are provided with the handles C and D, which said handles are pivoted together at $x$, so that the cups may be separated or brought together similar to the blades of a pair of shears. In the bottom of cup A is formed a small recess, and this recess is provided with a series of slots or openings which radiate from its centre toward the mouth of the cup. These slots or openings are for the purpose of allowing the lemon juice to escape from the cup. In using this instrument a lemon is cut into two equal parts, and one part is placed in the cup A, the cup part down. By means of the handles, the cup B is brought down, and pressing the lemon into the cup A presses the juice from it, which said juice, as before stated, passes out through the slots or openings in the recess of the cup A. The space between the two cups allows the juice to be pressed out without breaking the seed, and the slots are so formed and are of such a size as not to allow any seed to pass through them. The flange $d$ only allows one cup to go down a certain distance into the other, and then fitting over the mouth of cup A prevents the escape of any juice upwards. The peculiar shape of cup A with its recess insures the squeezer against clogging or choking.

Having thus fully described our invention, what we claim as new, and desire to secure by Letters Patent, is—

The combination of the two handles C and D, hinged together as shown, with the two cups A and B, one provided with a slotted recess, and the other with a flange, $d$, the several parts being constructed and used as and for the purpose herein set forth.

In testimony that we claim the foregoing improvements in lemon-squeezers, we have hereunto set our hands and seals this 12th day of December, 1866.

THOMAS REECE,
ARTHUR CLARKE.

Witnesses:
FRANK S. DUPONT,
THOMAS WILSON.